United States Patent [19]

Henneman

[11] 3,875,684

[45] Apr. 8, 1975

[54] GRAIN DRYER

[75] Inventor: John W. Henneman, Davenport, Iowa

[73] Assignee: The Bendix Corporation, South Bend, Ind.

[22] Filed: Mar. 29, 1974

[21] Appl. No.: 456,324

[52] U.S. Cl. ............... 34/218; 34/36; 99/467; 426/418
[51] Int. Cl. ............................................. F26b 19/00
[58] Field of Search ......... 34/36, 218, 233, 165, 60, 34/80, 82, 37; 426/419, 418, 271; 99/467, 99/468, 473, 474, 475, 476

[56] References Cited
UNITED STATES PATENTS

| | | | |
|---|---|---|---|
| 2,032,264 | 2/1936 | Davis | 426/419 |
| 2,483,064 | 9/1949 | Reich | 426/418 |
| 2,789,059 | 4/1957 | Lindewald | 426/418 |
| 2,952,541 | 9/1960 | Fayhee | 34/36 |
| 3,023,841 | 3/1962 | Milton et al. | 34/36 |

*Primary Examiner*—Kenneth W. Sprague
*Assistant Examiner*—James C. Yeung
*Attorney, Agent, or Firm*—Leo H. McCormick, Jr.; William N. Antonis

[57] ABSTRACT

A system whereby grain spoilage is retarded by flowing a dry nitrogen effluent through the grain to remove moisture therefrom. The nitrogen effluent is produced by passing ambient air under pressure through a molecular sieve which will adsorb both oxygen and water in a first condition and release the oxygen and water in a second flow condition. The nitrogen effluent will flow under pressure in a supply conduit to a storage bin and upon expanding to ambient pressure will adsorb moisture from the grain retained in the storage bin.

12 Claims, 2 Drawing Figures

GRAIN DRYER

BACKGROUND OF THE INVENTION

Feed grains produced on farms need to be dried to reduce the moisture content thereof as that spoilage of the grain can be effectively controlled. Spoilage is primarily caused by air borne mold spores which germinate in a warm, moist atmosphere. In the past, farmers left grain, such as corn, milo, soybeans, etc., in the field until the first killing frost. After such a frost the plant ceased to produce sap from which the grain derives substance. With the production of sap terminatted, the wind and sun rapidly reduced the moisture content in the grain head.

Through experimentation it was determined that the grain matured before the stalk dried, but unfortunately the moisture content was too high to assure that spoilage would not take place upon storage. Later, it was determined that the grain could be dried by heating air to a high temperature with propane gas heat and circulating the hot air through the grain to pick up moisture. The hot dry air is circulated in the grain until the moisture content is reduced to below 15%. Unfortunately, with the current reduction in availability of propane gas coupled with a substantial increase in cost, some farmers have been unable to derive a just return on their financial investment. Further, grain which is rapidly dried by hot air has a tendency to shrivel with a corresponding loss of nutritional value.

SUMMARY OF THE INVENTION

I have devised a system for drying grain through the use of molecular sieving material whereby the grain texture is unimpaired during drying. Spoilage of the grain is prevented by the removal of oxygen from the storage bin thereby inhibiting the growth of mold or other spores. This will permit a farmer to store grain whose moisture content is above 15 percent in a hermetically sealed silo in which the air has been replaced by a nitrogen enriched effluent delivered under pressure. The nitrogen enriched effluent is derived from pressurized ambient air. A compressor means capable of producing about 10 CFM of air flow will pressurize the ambient air and transmit the same to a solenoid operated flow control valve. The control valve will alternately communicate pressurized air through a first chamber and a second chamber in a separator means. The molecular sieve material, which will be located in the first and second chambers, will absorb moisture and oxygen from the ambient air to produce a dry nitrogen enriched effluent. A flow control means connected to the first and second chambers will divert a first portion of the pressurized nitrogen effluent to the first and second chamber not receiving the pressurized air flow from the compressor in order to remove the oxygen and water vapor or moisture retained in the molecular sieve material. The remainder of the pressurized nitrogen enriched effluent is communicated to the storage bin where it is uniformly distributed throughout the grain. This dry nitrogen enriched effluent will pick up moisture in the grain and at the same time will reduce the percentage of oxygen in the storage bin to that approaching the effluent. A flapper valve means on the storage bin will permit the nitrogen effluent laden with moisture to escape to the atmosphere. When the moisture content is reduced to 15 percent or below the flapper valve means is closed and the opening sealed. A check valve, with a varying rate, is adjusted to slightly pressurize the storage bin with a nitrogen enriched effluent. When the storage bin is pressurized to the optimum for the grain stored therein, the supply of dry nitrogen enriched effluent is terminated and the storage bin sealed.

It is therefore an object of this invention to provide a system for the prevention of grain spoilage by storing the grain in a nitrogen enriched environment.

It is another object of this invention to retard grain spoilage by storing the grain in a nitrogen effluent issuing from a chamber wherein a molecular sieve retains oxygen and moisture.

It is a still further object of this invention to provide a system for drying grain, which does not normally require heat, whereby a dry nitrogen enriched effluent produced from a molecular sieve separator is circulated through the grain to prevent spoilage.

These and other objects will become apparent from reading the specification and viewing the drawings.

DETAILED DESCRIPTION OF THE PREFERRED EMBODIMENT

Figures 1, 2:
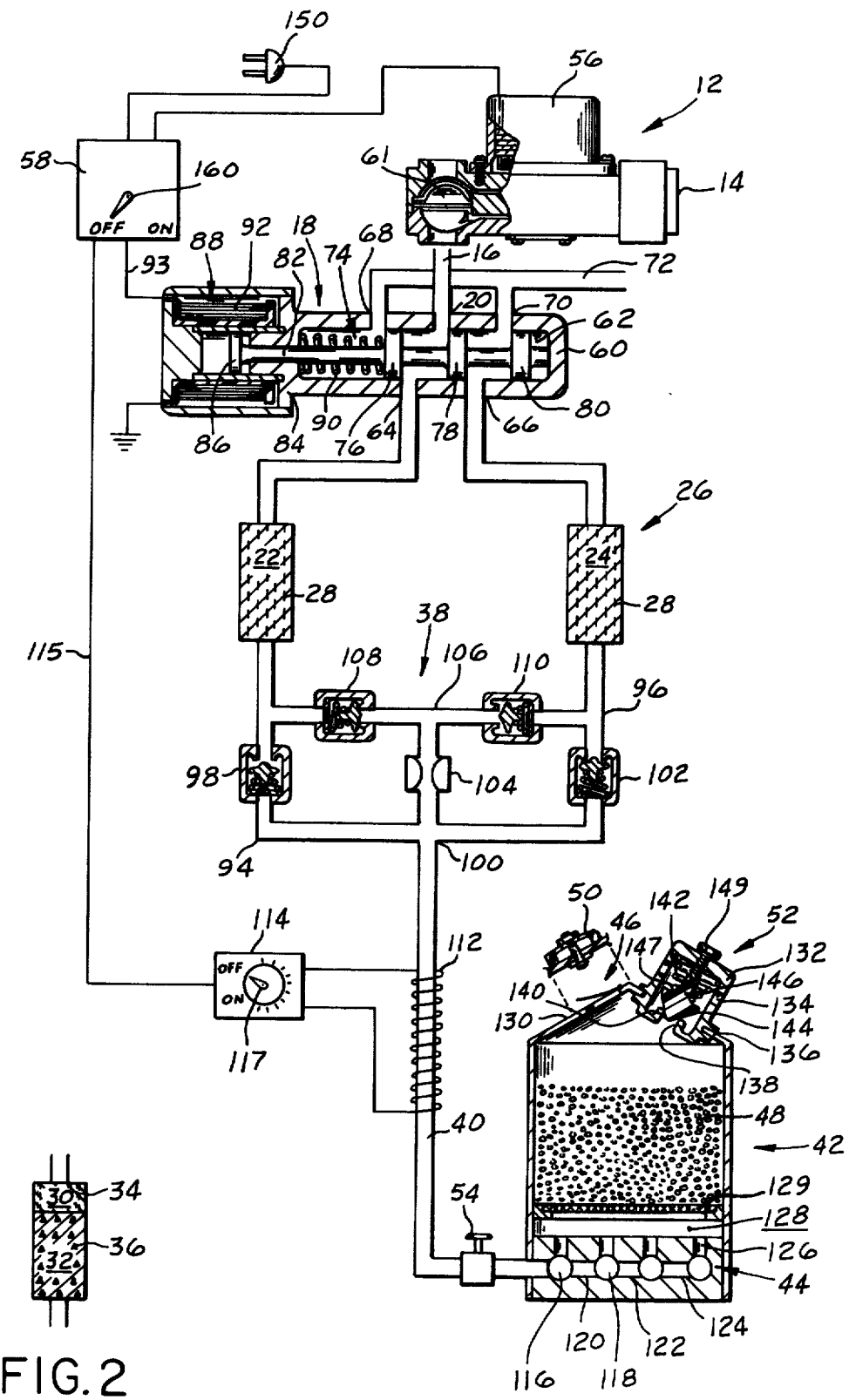
FIG. 1 is a schematic illustration of the grain drying system incorporating this invention which shows a sectional view of the control valve and separator through which a nitrogen enriched effluent continually flows to a storage bin containing grain.
FIG. 2 is a sectional view of another embodiment of the separator wherein anthracite coal may be used as the molecular sieve.

In the drawing in FIG. 1, a compressor means 12 is connected to the atmosphere through an air filter 14 for delivering air under pressure to a supply conduit 16. The supply conduit 16 is connected to an inlet 20 of a solenoid control valve means 18. The solenoid control valve means 18 will alternately permit the pressurized air which is supplied to the inlet port 20 to be delivered to a first chamber 22 or a second chamber 24 of a separator means 26. Each of the chambers 22 and 24 retain a molecular sieve material 28 having a pore size of 4 antrons. The particular molecular sieve material located in the first chamber 22 and the second chamber 24 will normally be a zeolite, however, as shown in FIG. 2, the chambers can be broken down into a first compartment 30 and a second compartment 32. In FIG. 2 the first compartment 30 will retain a desiccant 34, such as silica jel for the removal of water from the pressurized air while the second compartment 32 will contain a molecular sieve 36 such as a zeolite, synthetic resin, or anthractie coal. Both synthetic resin and anthracite coal have an affinity to oxygen and as such, a nitrogen enriched effluent can be produced therefrom and used for special conditions to produce a dry nitrogen enriched effluent. However, for most purposes a zeolite, as illustrated in FIG. 1, will be used to both remove moisture from the air and produce the nitrogen enriched effluent since it is readily available at a modest cost.

The nitrogen enriched effluent produced from the pressurized air upon flowing from the first chamber 22 and the second chamber 24 will be delivered to a directional flow controlling means 38. The directional flow controlling means 38 will deliver the nitrogen enriched effluent through the delivery conduit 40 to a storage bin 42. The storage bin 42 has a distribution system 44 through which the nitrogen enriched effluent is uniformly distributed to the grain. A flapper valve means 46 is located in the top of the storage bin 42 to permit the nitrogen effluent laden with moisture to escape to the atomsphere. When the moisture in the grain 48 has been reduced to an acceptable level, the flapper valve means 46 is closed and the opening sealed by cap 50. After that, the nitrogen effluent is permitted to pressurize the storage bin 42 to a level as determined by check valve means 52. When the pressurization of the storage bin 42 reaches a predetermined level, hand control valve 54 is turned off to seal the interior of the storage bin 42 from the atmosphere and suspend the grain therein in a nitrogen enriched atmosphere.

In more particular detail, the various elements will now be explained.

The compressor means 12 includes an electric motor 56 which is connected to a cycling control means 58. The cycling control means 58 will supply the electric motor 56 with electrical energy causing the motor to rotate blade 61 and pressurize the air passing through filter 14 from the atmosphere. This pressurized air will be delivered by supply conduit 16 to the solenoid control valve means 18.

The solenoid control valve means 18 consists of a housing 60 having an axial bore 62 therein. The inlet port 20 connects the conduit 16 with the axial bore 62. The axial bore 62 has a first port 64 which connects the axial bore 62 with the first chamber 22, a second port 66 which connects the axial bore 62 with the second chammber 24, and a third port 68 and a fourth port 70 which connects the axial bore 62 with the atmosphere through conduit 72. A spool valve means 74 located in the axial bore 62 has a first land 76 for regulating communication between the first port 64 and the third port 68, a second land 78 for regulating communication between the inlet port 20 and the first port 64 and second port 66, and a third land 80 for regulating communication between the second port 66 and the fourth port 70. The spool valve means 74 has a stem 82 which extends through a bearing wall 84 and is attached to the plunger 86 of the solenoid 88. A spring or other resilient means 90 is located in the axial bore 62 and acts on the first land 76 to position the spool in a first location. In this first location a first flow path is established through the valve means 18 to the separator means 26. Upon electrical energy being supplied to the coil 92 on lead 93 from cycling control means 58, plunger 86 will move against the spring 90 to reposition the spool means 74 in a second location within the axial bore 62 and thereby establish a second flow path through the separator means 26.

The flow distribution means 38 has a first conduit 94 with a check valve 98 located therein to only permit flow from the chamber 22 to be presented to a tee 100 in the supply conduit 40 and a second conduit 96 with a check valve 102 located therein to only permit flow from chamber 24 to the tee 100. A restriction 104 connected to tee 100 will permit a portion of the flow of the nitrogen enriched effluent to flow to a parallel conduit 106. A third check valve 108 will permit flow to conduit 94, and a fourth check valve 110 will permit flow to conduit 96.

An electrical resistance heater 112 can be wrapped around the supply conduit 40 to raise the temperature of the nitrogen enriched effluent which is supplied the distribution supply 44. The electrical resistance heater 112 has a control 114 connected to cycling control means 58 by lead 115 to receive electrical energy therefrom. A reostat control 117 is associated with the control 114 to vary the range of temperature produced in the heater 112.

The distribution system 44 in the storage bin 42 consists of a series of circular conduits 116 and 118 which are interconnected by conduits 120, 122 and 124. A series of identical openings 126 in the top of the circular conduit carry the nitrogen enriched effluent to a chamber 128.

The nitrogen enriched effluent being under pressure will pass through screen 129 and flow through the grain to the top of the storage bin 42. While the flapper valve means 46 is opened, the nitrogen effluent, ladened with moisture absorbed from the grain, can freely pass to the atmosphere. Upon sealing the flapper valve means 46 which completely covers opening 130 with cap 50, the check valve means 52 will permit the nitrogen enriched effluent to pass to the atmosphere after a predetermined build-up in pressure occurs in the storage bin 42.

The check valve means 52 consists of a housing 132 with openings 134 located therein. The housing 132 is attached to the storage bin 42 by flange 136. An opening 138 in the housing 132 has a lip 140 which provides a seat for a poppet means 142. The poppet means 142 has a tapered face 144 and guide stem 146. A spring 147 surrounds the guide stem 146 to urge the tapered face 144 on to seat 140. An adjustable nut 149 is located in the housing to provide a varying preload on the spring 147 to establish the predetermined pressure level in the storage bin 42.

MODE OF OPERATION OF THE PREFERRED EMBODIMENT

Electrical energy is supplied through plug 150 to the cycling control means 58. A switch 160 therein will permit electrical energy to flow to electrical motor 56. The motor 56 will rotate blade 61 and pressurized air from the atmosphere which passes through filter 14.

This pressurized air will be supplied to the axial bore 62 through outlet conduit 16. As shown in FIG. 1, spring 90 has positioned spool means 74 such that the flow from port 20 is through the first port 64 to the first chamber 22. The zeolite in chamber 22 will absorb both the oxygen and moisture from the pressurized air to produce a pressurized nitrogen effluent which will flow in conduit 94 past check valve 98 to tee 100. A portion of the nitrogen effluent will flow through restriction 104 past check valve 110 to the second chamber 24 where any oxygen and water retained therein is picked up and returned to the atmosphere by flowing through the seond port 66 into the axial bore 62 and out the fourth port 70.

The remainder of the nitrogen effluent will be carried to the distribution system 44 to dry the grain by absorbing moisture therefrom.

When the optimum time period for the efficiency of the zeolite is reached, the cycling means 58 will supply the coil 92 with electrical energy which will move plunger 86 against the opposition of spring 90. Note that land 80 is larger than both lands 76 and 78, thus, the total distance needed to travel by the plunger is equal to this width to change the directional flow of the pressurized air from the first port 64 to the second port 66 to assure complete segregation between the first flow path and the second flow path.

In the second flow path, the pressurized air will flow to the second chamber 24 where the moisture and oxygen is retained while permitting the nitrogen enriched effluent to flow through conduit 96 to tee 100. In this flow path, that portion of the nitrogen effluent flowing through restriction 104 will pass check valve 108 to remove oxygen and moisture from the zeolite in the first chamber 22 by passing through the first port 64 into the axial bore 62 out the third port 68 to the atomsphere.

In this system the nitrogen effluent flowing past tee 100 to the supply conduit 40 is essentially continuous and will uniformly reduce the moisture content in the grain to level at which spoilage is retarded since the presence of oxygen is reduced to a point where mold growth etc. is eliminated.

I claim:

1. A system for removing moisture from grain stored in a container to retard grain spoilage, said system comprising:
   compressor means for pressurizing air;
   valve means connected to said compressor means for sequentially directing said pressurized air into a first flow path and into a second flow path;
   separator means having a first chamber and a second chamber connected in series with said valve means, said first chamber and said second chamber each containing a quantity of molecular sieve material which will adsorb oxygen and water to produce a pressurized nitrogen enriched effluent whose relative humidity approaches zero;
   cycling means connected to said valve means for maintaining an optimum time interval for flowing pressurized air to one of said first and second chambers;
   parallel conduit means connecting the first chamber and the second chamber to supply an output conduit with said nitrogen enriched effluent, said parallel conduit means being interconnected by a restrictive passage;
   directional flow controlling means for permitting a portion of said nitrogen enriched effluent to be communicated from said restrictive passage to the other of said first and second chambers for desorbing oxygen and water from the molecular sieve material contained therein by expanding to atmospheric pressure;
   distributing means connected to said output conduit for uniformly flowing said pressurized nitrogen effluent throughout the grain in the container, said pressurized nitrogen effluent expanding in said container and adsorbing any moisture in said grain; and
   flow control means operatively connected to said storage container for permitting the moisture laden nitrogen effluent to escape to the atmosphere.

2. The system, as recited in claim 1, wherein said flow control means includes:
   flapper valve means located in the top of the storage container, said flapper valve means providing a water tight closure for an opening through which the moisture laden nitrogen effluent can pass essentially uninterrupted.

3. The system, as recited in claim 2, wherein said flow control valve means further includes:
   closure means connected to said flapper valve for closing the opening to seal the opening and prevent the escape of the nitrogen effluent therethrough.

4. The system, as recited in claim 3, wherein said flow control means further includes:
   check valve means located on said storage container for permitting a pressure build-up of nitrogen effluent in the storage container.

5. The system, as recited in claim 4, wherein said check valve means includes:
   adjustable means for varying the pressure build-up of the nitrogen effluent.

6. The system, as recited in claim 5, wherein said valve means includes:
   a housing having a bore therein with an inlet port connected to said compressor means for receiving said pressurized air, a first port connected to said first chamber, a second port connected to said second chamber, a third port connected to the atmosphere and a fourth port connected to the atmosphere;
   spool means located within said bore for providing an interrupted flow along said first path between the inlet port and the first chamber through the first port and between the fourth port and the second chamber through the second port in a first position to establish the first flow path and between the inlet port and second chamber through the second port between the third port and the first chamber through the first port and the second position to establish the second flow path;
   resilient means located in said bore for positioning said spool means in one of said first and second positions; and
   solenoid means connected to said spool means and receiving an operational signal from said cycling means for overcoming the resilient means and moving the spool means to the other of said first and second positions.

7. The system, as recited in claim 6, wherein each of said first and second chambers includes:
   a first section for holding first adsorbing material to retain moisture therein upon the passage of pressurized air thereto from the compressor means; and
   a second section for holding a second adsorbing material having a uniform pore size of 4 antrons to retain oxygen present in the air therein upon receiving dried air from the first section to produce said nitrogen enriched effluent.

8. The system as recited in claim 7, wherein said second adsorbing material is a zeolite composition.

9. The system, as recited in claim 8, wherein said second adsorbing matetial is anthracite coal.

10. A system for retarding spoilage of grain retained in a storage container by suspension in an inert atmosphere of nitrogen, said system comprising:
    compressor means for pressurizing air above atmospheric pressure;
    valve means connected to said compressor means for sequentially directing said pressurized air into a first flow path and into a second flow path;
    separator means having a housing with a first chamber and a second chamber connected in series with said valve means, said first chamber and said second chamber each containing a quantity of molecular sieve material which will adsorb oxygen to produce a pressurized nitrogen enriched effluent;

cycling means connected to said valve means for maintaining an optimum time interval for presenting pressurized air to one of said first and second chambers;

parallel conduit means connecting the first chamber and the second chamber to supply an output conduit with said nitrogen enriched effluent, said parallel conduit means being interconnected by a restrictive passage;

directional flow controlling means for permitting a portion of said nitrogen enrich effluent to be communicated from said restrictive passage to the other of said first and second chamber for desorbing oxygen from the molecular sieve material contained therein by expanding to atmospheric pressure;

distributing means connected to said output conduit for uniformly presenting said pressurized nitrogen effluent throughout the grain in the storage container; and flow control means located on said storage container for permitting air to escape to the atmosphere upon said pressurized nitrogen occupying the storage bin.

11. The system, as recited in claim 10, wherein said flow control means includes:

flapper valve means located in the top of the storage container, said flapper valve means providing a water tight closure for an opening through which the air can pass essentially uninterrupted until said nitrogen effluent occupies said storage bin;

closure means connected to said flapper valve for closing the opening to prevent the escape of the nitrogen effluent therethrough; and check valve means located on said storage container for permitting a pressure build-up of nitrogen effluent in the storage container.

12. The system, as recited in claim 11, wherein said valve means includes:

a housing having a bore therein with an inlet port connected to said compressor means for receiving said pressurized air, a first port connected to said first chamber, a second port connected to said second chamber, a third port connected to the atmosphere and a fourth port connected to the atmosphere;

spool means located within said bore for providing an interrupted flow along said first path between the inlet port and the first chamber through the first port and between the fourth port and the second chamber through the second port in a first position to establish the first flow path and between the inlet port and second chamber through the second port between the third port and the first chamber through the first port and the second position to establish the second flow path;

resilient means located in said bore for positioning said spool means in one of said first and second positions; and solenoid means connected to said spool means and receiving an operational signal from said cycling means for overcoming the resilient means and moving the spool means to the other of said first and second positions.

* * * * *